United States Patent
Tsirkin

(10) Patent No.: US 9,330,036 B2
(45) Date of Patent: May 3, 2016

(54) INTERRUPT REDUCTION BY DYNAMIC APPLICATION BUFFERING

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 68 days.

(21) Appl. No.: 14/089,493

(22) Filed: Nov. 25, 2013

(65) Prior Publication Data

US 2015/0149667 A1 May 28, 2015

(51) Int. Cl.
*G06F 13/24* (2006.01)
*G06F 3/06* (2006.01)
*G06F 5/06* (2006.01)

(52) U.S. Cl.
CPC . *G06F 13/24* (2013.01); *G06F 5/06* (2013.01)

(58) Field of Classification Search
None
See application file for complete search history.

(56) References Cited

U.S. PATENT DOCUMENTS

| | | | |
|---|---|---|---|
| 6,868,466 B2 | 3/2005 | Connor | |
| 7,099,328 B2 * | 8/2006 | Galbi et al. | 370/395.1 |
| 7,831,749 B2 | 11/2010 | Pope et al. | |
| 8,279,231 B1 * | 10/2012 | Duncan et al. | 345/543 |
| 8,346,971 B2 | 1/2013 | Roberts et al. | |
| 8,489,761 B2 | 7/2013 | Pope et al. | |
| 2006/0190661 A1 * | 8/2006 | Ogilvie et al. | 710/310 |
| 2013/0019042 A1 | 1/2013 | Ertugay et al. | |

OTHER PUBLICATIONS

Jonathan Corbet; TCP Small Queues, Posted Jul. 19, 2012 by Butlerm (Subscriber #13312), pp. 1-2, retrieved on Dec. 5, 2013 from https://lwn.net/Articles/507065/.
Mellanox Technologies, Inc.,, Performance Tuning Guidelines for Mellanox Network Adapters, Revision 1.11 http://www.mellanox.com/related-docs/prod_software/Performance_Tuning_Guide_for_Mellanox_Network_Adapters.pdf; Copyright 2012, Mellanox Technologies, Inc., Sunnyvale, CA 94085, U.S.A.
K. Salah et al., Implementation and Experimental Performance Evaluation of a Hybrid Interrupt-Handling Scheme; Computer Communications 32 (2009), Apr. 9, 2008, pp. 179-188, retrieved Jan. 2, 2014 from http://www.researchgate.net/publication/222684748_Implementation_and_experimental_performance_evaluation_of_a_hybrid_interrupt-handling_scheme/file/9fcfd5111218b4e98e.pdf.
How to Achieve Gigabit Speeds with Linux, pp. 1-7, retrieved Dec. 9, 2013 from http://datatag.web.cern.ch/datatag/howto/tcp.html.

* cited by examiner

*Primary Examiner* — Ilwoo Park
(74) *Attorney, Agent, or Firm* — Haynes and Boone, LLP

(57) ABSTRACT

Systems and methods are disclosed for processing a queue associated with a request. An example system includes an input/output (I/O) interface that receives a request associated with a channel. The example system also includes an association module that determines whether a condition is satisfied. When the condition is determined to not be satisfied, the association module, after a hardware device completes processing the request, decrements an in-flight counter that represents a first amount of data in the channel. When the condition is determined to be satisfied, the association module, before the hardware device completes processing the request, decrements the in-flight counter.

20 Claims, 6 Drawing Sheets

INTERRUPT REDUCTION BY DYNAMIC APPLICATION BUFFERING

BACKGROUND

The present disclosure generally relates to processing requests, and more particularly to processing a queue associated with a request.

In networking, an application may send data though an operating system (OS) kernel for transmission over a network. For good performance, a queue is maintained such that an application can request sending multiple messages, which may be sent asynchronously or synchronously. Traditionally, a system may limit the amount of data the application may queue (or buffer) for transmission. For example, UNIX supports SNDBUF socket parameter to control this buffering.

BRIEF SUMMARY

This disclosure relates to processing requests. Methods, systems, and techniques for processing a request from a channel are provided.

According to an embodiment, a system for processing a request from a channel includes an input/output (I/O) interface that receives a request associated with a channel. The system also includes an association module that determines whether a condition is satisfied. When the condition is determined to not be satisfied, the association module, after a hardware device completes processing the request, decrements an in-flight counter that represents a first amount of data in the channel. When the condition is determined to be satisfied, the association module, before the hardware device completes processing the request, decrements the in-flight counter.

According to another embodiment, a method of processing a request from a channel includes receiving a request associated with a channel and determining whether a condition is satisfied. The method also includes when the condition is determined to not be satisfied, after a hardware device completes processing the request, decrementing an in-flight counter that represents a first amount of data in the channel. The method further includes when the condition is determined to be satisfied, before the hardware device completes processing the request, decrementing the in-flight counter.

According to another embodiment, a non-transitory machine-readable medium includes a plurality of machine-readable instructions that when executed by one or more processors are adapted to cause the one or more processors to perform a method including: receiving a request associated with the channel; determining whether a condition is satisfied; when the condition is determined to not be satisfied: after a hardware device completes processing the request, decrementing an in-flight counter that represents a first amount of data in a channel; and when the condition is determined to be satisfied: before the hardware device completes processing the request, decrementing the in-flight counter.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
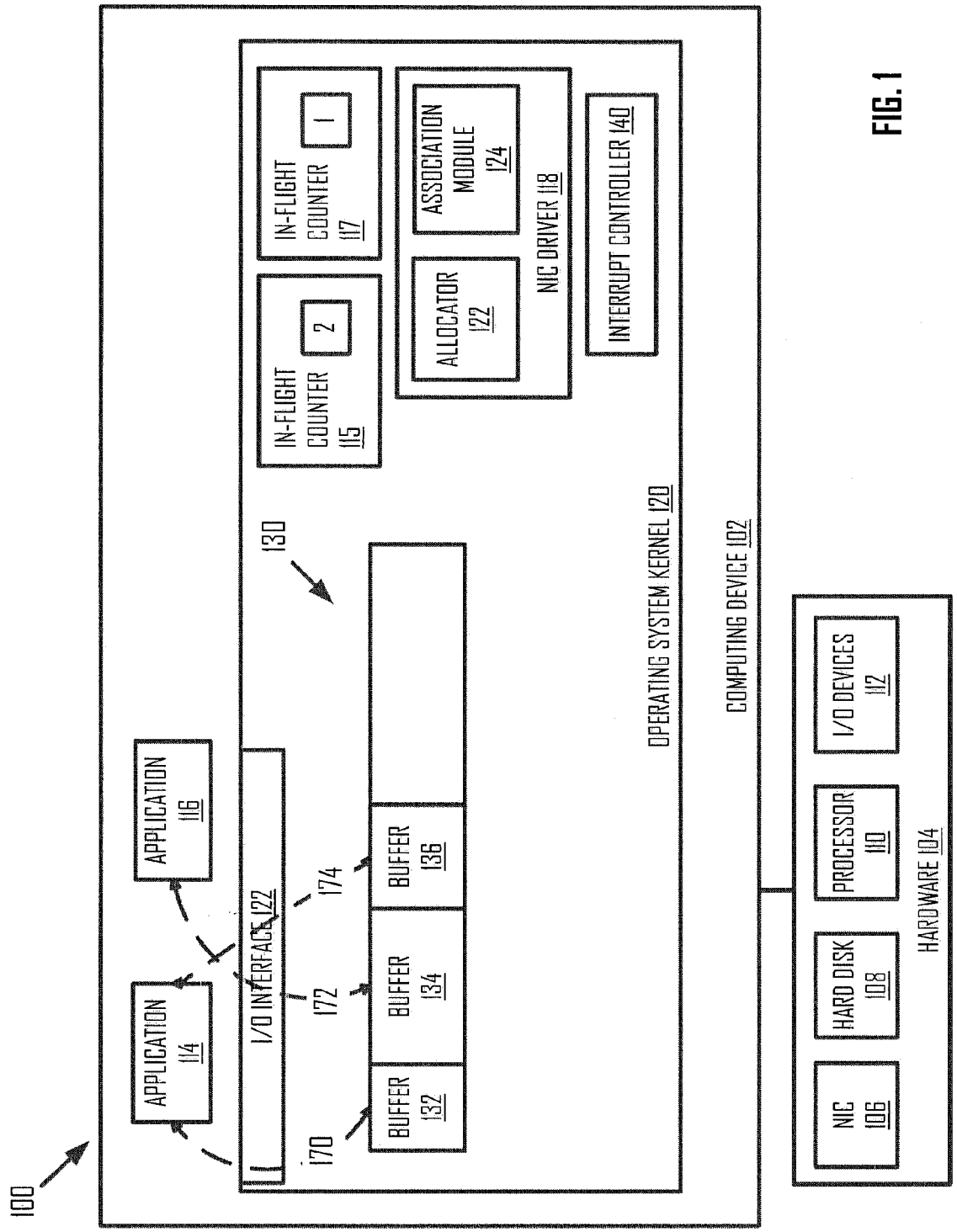
FIG. 1 is a simplified block diagram illustrating a system for processing a request from a channel, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture
   A. Channel Requests
   B. Increment the In-Flight Counter
      1. Do Not Queue the Request From the Channel
      2. Queue the Request From the Channel
   C. Decrement the In-Flight Counter
      1. Orphan Early
      2. Orphan Late
      3. Remove Association Between Buffer and Channel
   D. Transmit Interrupts
III. Another Example System Architecture
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

An operating system (OS) kernel executing in a computing device may include one or more queues specific to a hardware device. A queue may be specific to the hardware device such that it processes data stored in the queue. A channel executing in the computing device may send a request to the kernel for processing. The channel may be, for example, an application, a virtual machine, or a virtual device, and the channel may use one or more queues. The request may be processed by the hardware device. It may be inefficient for the hardware device to process requests one at a time. Accordingly, a buffer may be allocated and include the computing device's resources allocated for the request. The buffer may be placed in the queue specific to the hardware device for eventual processing by the hardware device. When the hardware device finishes processing the request, the buffer allocated for the request may be freed and the OS resources that were consumed by the buffer may be reused for other purposes.

The kernel may limit the amount of data that any particular channel queues at any one time. In an example, the kernel maintains an "in-flight" counter that is specific to a channel and represents an amount of data that is stored in the channel, which may use one or more queues. The in-flight counter may be represented in various units. The units may be, for example, a quantity of bytes, packets, and/or buffers that is allocated for the request and stored in one or more queues for the channel. In response to receiving a request from a channel, the kernel increments the in-flight counter specific to that particular channel by the appropriate quantity of units allocated for the request. The kernel may also decrement, before or after the request has been processed by the hardware device, the in-flight counter specific to that particular channel by the appropriate quantity of units allocated for the request.

An "orphan late" mode may refer to decrementing the in-flight counter after the hardware device has finished processing the request. An advantage of the orphan late mode may be that a greedy channel may be unable to prevent other channels from submitting requests and having them queued for processing. The greedy channel sends a large quantity of requests and may be slowed down because the kernel waits until after the hardware device finishes processing a request before decrementing the in-flight counter specific to the channel. As such, requests from a channel may be slowed down because the channel's in-flight counter is decremented at a slower pace compared to the orphan early mode discussed below. Additionally, the system may be fair because the greedy channel obtains access to the hardware device without the risk of starving other channels. A disadvantage, however, may be that the kernel does not decrement the in-flight counter until the kernel receives a transmit interrupt from the hardware device indicating that it has completed processing the request. The use of transmit interrupts may slow down the system.

An "orphan early" mode may refer to decrementing the in-flight counter before the hardware device has finished processing the request. An advantage of the orphan early mode may be that transmit interrupts are unnecessary. As such, the transmit interrupts may be disabled, thus reducing system overhead and improving system performance. Another advantage of the orphan early mode may be that buffers are placed in the queue faster. During slow periods in which the kernel receives few requests from channels, it may be advantageous to enable the queue to fill up quickly with requests from these channels because of the low risk of starving other channels. A disadvantage, however, may be that a greedy channel may buffer up to the limit allowed in the queue, possibly starving other channels and preventing them from having access to the hardware device to process their requests. For example, the greedy channel may continuously send a high number of requests and fill up the queue to its maximum, preventing other channels from having their requests queued. A queued request or queued data may refer to data that is placed in the queue for processing.

It may be desirable to dynamically switch between the orphan early mode and the orphan late mode. The switch may be performed based on, for example, how much free space is in the queue. It may be advantageous to implement the orphan early mode when the queue stores an amount of data that does not exceed a data threshold amount (e.g., partially empty) because the risk of channel starvation is lower compared to when the queue stores an amount of data that exceeds the data threshold amount (e.g., partially full). In such an example, the queue may store an amount of free data that exceeds a free threshold amount. In contrast, it may be advantageous to implement the orphan late mode when the queue stores an amount of data that exceeds the data threshold amount (e.g., partially full) because the risk of channel starvation is higher compared to when the queue stores an amount of data that does not exceed the data threshold amount (e.g., partially empty). In such an example, the queue may store an amount of free data that does not exceed the free threshold amount. The disclosure provides techniques to avoid the use of transmit interrupts when channels are well-behaved (not greedy) and to avoid starvation when channels are not well-behaved. Accordingly, the use of transmit interrupts may be reduced.

In an embodiment, a system for processing a buffer allocated for a request includes an input/output (I/O) interface that receives a request associated with a hardware device. The system also includes an association module that determines whether a condition is satisfied. When the condition is determined to not be satisfied, the association module, after the hardware device completes processing the request, decrements an in-flight counter that represents a first amount of data in a channel. When the condition is determined to be satisfied, the association module, before the hardware device completes processing the request, decrements the in-flight counter.

II. Example System Architecture

FIG. 1 is a simplified block diagram 100 illustrating a system for processing a request from a channel, according to an embodiment. Diagram 100 includes a computing device 102 coupled to hardware 104. Hardware 104 includes a network interface card (NIC) 106, hard disk 108, processor 110, and other I/O devices 112. Computing device 102 may run one or more channels that uses resources of computing device 102. A channel may be, for example, an application, a virtual machine, or a virtual device. Each of the channels may have an in-flight counter that is specific to that channel and represents an amount of data allocated for requests from the channel. In FIG. 1, computing device 102 may run application 114 and/or application 116. An in-flight counter 115 is specific to application 114 and is incremented based on requests from application 114, and an in-flight counter 117 is specific to application 116 and is incremented based on requests from application 116. An in-flight counter may be the amount of data in a channel. The channel may store data in one particular queue specific to a hardware device or a plurality of queues (e.g., all queues) specific to the hardware device.

A. Channel Requests

Computing device 102 also includes an OS kernel 120 that serves as an intermediary layer between hardware 104 and the software (e.g., applications 114 and 116). A channel sends a request for an action to be performed to kernel 120, and kernel 120 passes the channel's request to an appropriate hardware device that processes the request (e.g., performs the requested action). Kernel 120 abstracts computing device 102 on a high level such that the channel may send a request that is processed by a hardware device without knowing the fine details of the hardware device. Kernel 120 includes one or more device drivers that communicate with hardware devices coupled to computing device 102. A device driver supports channel (e.g., application) communication to enable data to be read from and written to a device. Kernel 120 may manage resources of computing device 102 when one or more channels is running on computing device 102. In an example, kernel 120 may share available resources (e.g., CPU time, disk space, and network connections) between various system processes while at the same time ensuring system integrity. In an example, kernel 120 is a LINUX® kernel. Trademarks are the property of their respective owners.

Kernel 120 includes an I/O interface 122 that receives from a channel a request associated with a hardware device. The following is a description of application 114 and NIC 106. This description applies as well to other channels (e.g., application 116) and/or to other hardware devices. Application 114 may desire to communicate with another application running on a computing device different from computing device 102. Application 114 may send a request along with associated data to kernel 120 for the data to be transferred over a network. Kernel 120 may receive the request, pack the data to be transmitted into various protocol layers prior to dispatch, and request the services of NIC 106 to process the request and send the appropriate data over the network. The process by which this is done may be irrelevant to the application because the details are abstracted by kernel 120. Kernel 120 includes a NIC driver 118 that communicates with NIC 106 to transmit the data over the network to the other application.

Kernel 120 may include one or more queues associated with a hardware device, and each queue may store one or more buffers. Each of the queues may be of different sizes relative to each other, and each of the buffers may be of different sizes relative to each other. In an example, NIC 106 is associated with a queue 130 that stores data to be processed. One or more queues may be specific to NIC 106. Queue 130 may be specific to NIC 106 such that the data stored in queue 130 is to be processed by NIC 106. Although one queue is illustrated as being specific to NIC 106, it should be understood that other embodiments in which more than one queue is specific to a hardware device are within the scope of the disclosure. In another example, computing device 102 may be coupled to a second NIC that is specific to a separate queue in kernel 120 (not shown), and the data in the separate queue is to be processed by the second NIC. In an example, the second NIC may have up to 64 queues, and each queue may store up to 128 buffers.

B. Increment the In-Flight Counter

NIC driver 118 includes an allocator 122 and an association module 124. In an embodiment, association module 124 increments, based on a request sent by a channel, an in-flight counter specific to the channel. In an example, kernel 120 maintains in-flight counter 115 and increments it based on requests from application 114. Kernel 120 also maintains in-flight counter 117 and increments it based on requests from application 116. For brevity and simplicity, a channel may be described as storing data in a single queue (e.g., queue 130) associated with the hardware device (e.g., NIC 106), but this is not intended to be limiting. For example, it should also be understood that other embodiments in which the channel stores data in a plurality of queues (e.g., all queues) associated with the hardware device are also within the scope of the disclosure.

An in-flight counter may be represented in various units. The units may be, for example, a quantity of bytes, packets, and/or buffers that is allocated for the request and stored in the channel. In the example illustrated in FIG. 1, in-flight counter 115 represents a quantity of buffers that is stored in the channel and based on requests from application 114. In such an example, association module 124 increments in-flight counter 115 by one, the quantity of buffers allocated for the request and stored in queue 130. In FIG. 1, in-flight counter 115 is two, which indicates that application 114 has two queued buffers, and in-flight counter 117 is one, which indicates that application 116 has one queued buffer. As illustrated in FIG. 1, buffers 132 and 136 are queued for a request from application 114, and a buffer 134 is queued for a request from application 116.

In another example, in-flight counter 115 represents a quantity of bytes that is stored in the channel and based on requests from application 114. Further, the channel may use queue 130 to store the bytes allocated for the request. In such an example, association module 124 increments in-flight counter 115 by the quantity of bytes allocated for the request and stored in buffer 132. In another example, in-flight counter 115 represents a quantity of packets that is stored in the channel and based on requests from application 114. Further, the channel may use queue 130 to store the packets allocated for the request. In such an example, association module 124 increments in-flight counter 115 by the quantity of packets allocated for the request and stored in buffer 132. Association module 124 may use one or more of these units at any one time to maintain one or more in-flight counters specific to a channel.

It may be undesirable to allow application 114 to fill up queue 130 with application 114's requests, especially if application 116 would also like to utilize NIC 106 and transmit data over a network. To prevent any single channel from flooding the network, association module 124 may limit the amount of queued data that is associated with requests from any single channel. Association module 124 may use a channel's in-flight counter to determine whether the channel has reached its limit of queued data. The request sent by the channel may be counted towards the specific unit limit for that particular channel.

1. Do not Queue the Request from the Channel

In an example, association module 124 compares the updated in-flight counter (e.g., the incremented in-flight counter) to a threshold count that represents the channel's limit of queued data. When the updated in-flight counter exceeds the threshold count, the channel has reached or exceeded its limit on the amount of data that the channel can queue at any one time. In such a situation, association module 124 may block the channel, save the request for later processing, and/or send a message to the channel indicating that the request was unsuccessful. Kernel 120 does not queue requests from blocked channels. In an example, kernel 120 increments in-flight counter 115 to determine whether any resources should be allocated for the request before actually allocating resources for the request. Kernel 120 decrements the updated in-flight counter by the appropriate units allocated for the request because the request is not queued for processing by the particular hardware device.

Association module 124 may unblock the channel when the channel's in-flight counter does not exceed the threshold count. When buffers allocated for requests from the channel associated with the in-flight counter are freed, the in-flight counter that previously exceeded the threshold count may fall below or equal to the threshold count. Additionally, channels may have different limits relative to each other. The different limits may depend on factors such as an importance of one channel compared to another channel, the time sensitivity of one channel compared to another channel, and the quantity of resources allocated for one channel compared to another channel. For example, the amount of data that application 114 can store in a single queue or a plurality of queues may exceed the amount of data that application 116 can store in the single queue or the plurality of queues, respectively.

2. Queue the Request from the Channel

In contrast, when the updated in-flight counter does not exceed the threshold count, the channel has not reached its limit on the amount of data that the channel can queue.

Accordingly, a buffer may be allocated for the request and stored in a queue for processing by a hardware device. In an example, allocator 122 allocates a buffer 132 for a received request and places buffer 132 in queue 130 for processing by NIC 106. A buffer may be a chunk of memory and include a set of computing device 102's resources allocated for the request. In an example, application 114 sends a big request to kernel 120, and allocator 122 splits up the big request into smaller requests such that one buffer is allocated per request.

Allocator 122 may place a set of packets associated with the request in buffer 132, where the set of packets includes data for processing the request. The hardware device completes processing the request by processing the set of packets in buffer 132. For example, in relation to the request from application 114 to transmit data over a network, allocator 122 may queue buffer 132 for transmission by placing the data in buffer 132 and passing a reference to buffer 132 (e.g., pointer or a memory address) along with a size of buffer 132 to NIC 106. NIC 106 may then access buffer 132 via the reference and start processing the request in queue 130 up to the buffer size. NIC 106 completes processing the request by transmitting the appropriate data in buffer 132 over a network. In this way, NIC 106 may process the buffer allocated for the request.

In an embodiment, association module 124 associates a buffer with the channel for which the buffer is allocated. In FIG. 1, association module 124 associates buffer 132 with application 114 as indicated by arrow 170, associates buffer 134 with application 116 as indicated by arrow 172, and associates buffer 136 with application 114 as indicated by arrow 174. Association module 124 may determine which buffers are associated with requests from which channels. The association enables association module 124 to determine which in-flight counter to update (e.g., increment or decrement) based on the channel associated with the buffer. Further, when a request from a channel is processed, the association between the buffer and channel may enable association module 124 to identify which buffer to free by identifying the buffer allocated for the request.

C. Decrement the In-Flight Counter

Association module 124 may decrement the in-flight counter before or after a request associated with the in-flight counter has been processed. To determine when to decrement the in-flight counter, association module 124 may determine whether a condition is satisfied. The condition may compare in-flight counter 115 with a data threshold amount or a free threshold amount associated with one or more queues.

1. Orphan Early

When the condition is determined to be satisfied, before the hardware device completes processing the request, association module 124 decrements the in-flight counter. In such an example, association module 124 may decrement the in-flight counter before the hardware device completes processing the request because the queue is partially empty and the probability of starving a channel is low. For example, it may be advantageous to allow queue 130 to fill up quickly with requests from application 114 because of the low risk of starving application 116 because queue 130 would also have adequate room for requests from application 116.

In an example, when an amount of free space in one or more queues associated with a hardware device exceeds a free threshold amount, the condition is satisfied. The amount of free space in the queue may be determined before or after a buffer allocated for the request is placed in the queue. The free threshold amount may be per queue or per hardware device and may be set by an administrator. In another example, when an amount of data stored in one or more queues associated with the hardware device does not exceed a data threshold amount, the condition is satisfied. The amount of data in the queue may be determined before or after a buffer allocated for the request is placed in the queue. The data threshold amount may be per queue or per hardware device and may be set by an administrator. Further, queues may have different data threshold amounts relative to each other and/or different free threshold amounts relative to each other. The different threshold amounts may depend on various factors such as a size of the queue and how fast the hardware device associated with the queue can process data. Additionally, the threshold amounts may be a threshold amount of bytes, packets, buffers, or a proportion of the queue (e.g., 75% of the queue).

Figure 2:
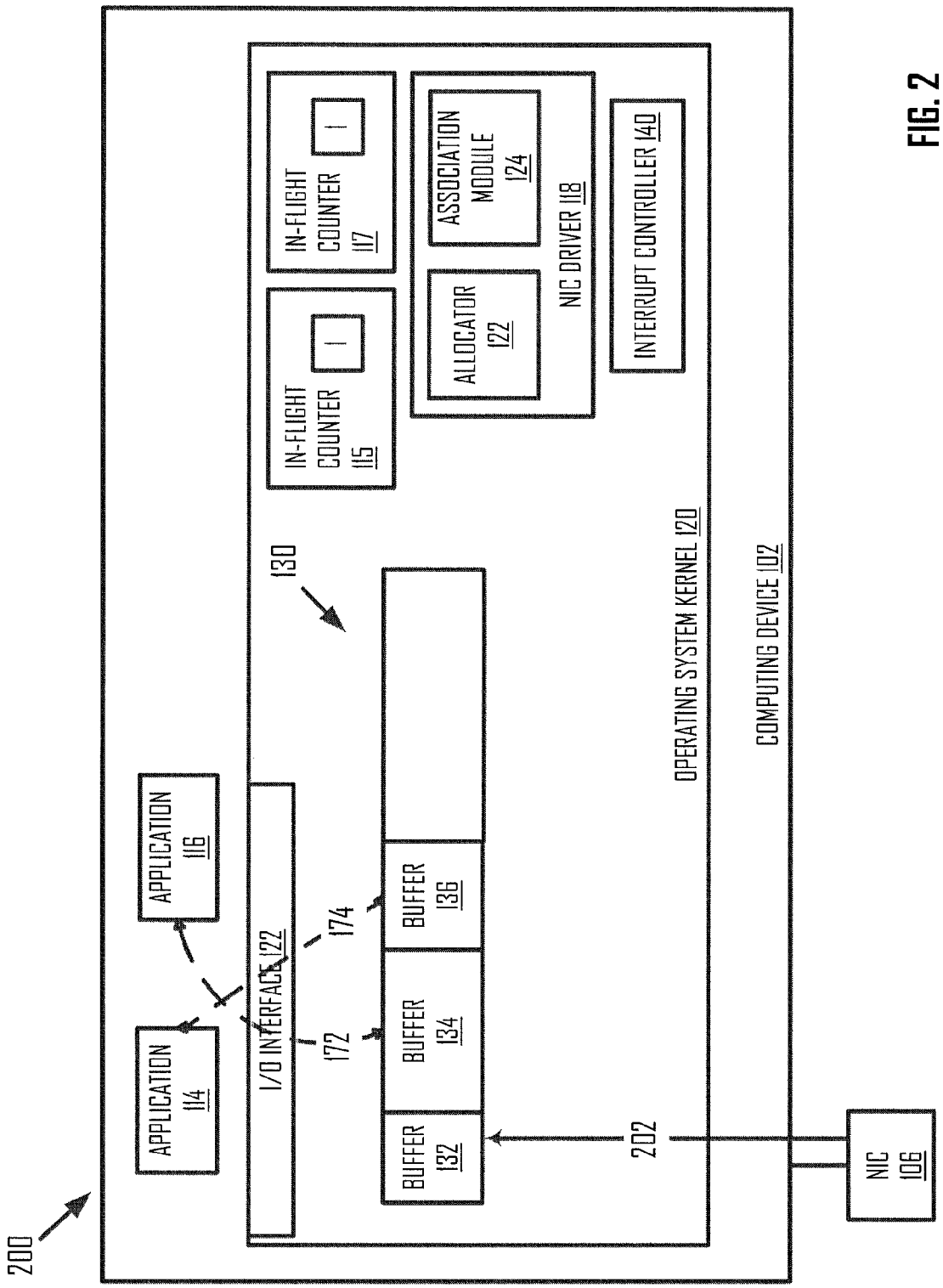
FIG. 2 is a simplified block diagram illustrating an in-flight counter being decremented before a hardware device has finished processing the request, according to an embodiment.

FIG. 2 is a simplified block diagram 200 illustrating an in-flight counter being decremented before a hardware device has finished processing the request, according to an embodiment. In diagram 200, NIC 106 is processing buffer 132, as indicated by arrow 202, and has not finished processing the request. Before NIC 106 completes processing the request, association module 124 may decrement in-flight counter 115 from two to one, which indicates that application 114 has one queued buffer (buffer 136). In some embodiments, association module 124 decrements in-flight counter 115 before NIC 106 starts processing the request. When association module 124 decrements in-flight counter 115 before NIC 106 completes processing the request, the data in buffer 132 that is not yet transmitted is not counted against application 114. As such, application 114 may send requests at a faster rate in the orphan early mode compared to the orphan late mode. Kernel 120 may continue to queue requests from application 114 for processing until in-flight counter 115 exceeds application 114's threshold counter.

2. Orphan Late

When the condition is determined to not be satisfied, after the hardware device completes processing the request, association module 124 decrements the in-flight counter. In such an example, association module 124 may decrement the in-flight counter after the hardware device completes processing the request because the queue is partially full and the probability of starving a channel is high. For example, it may be advantageous to slow down queue 130 from filling up quickly with requests from application 114 because of the high risk of starving application 116 because queue 130 is running out of room to queue requests from other channels. In an example, when the amount of free space in one or more queues associated with a hardware device does not exceed the free threshold amount, the condition is not satisfied. In another example, when the amount of data stored in one or more queues associated with the hardware device exceeds the data threshold amount, the condition is not satisfied.

Figure 3:
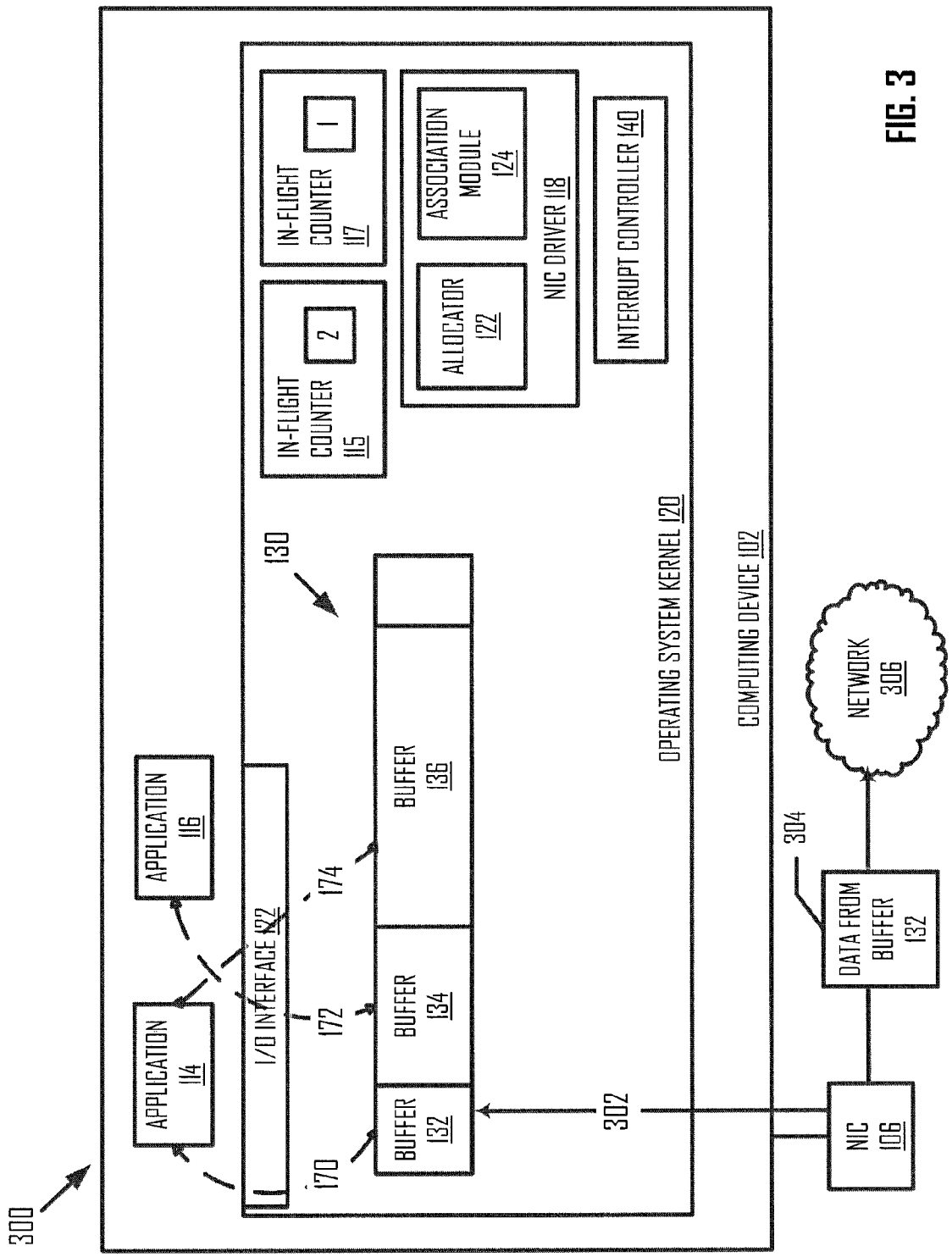
FIG. 3 is a simplified block diagram illustrating an in-flight counter being decremented after the hardware device has finished processing the request, according to an embodiment.

FIG. 3 is a simplified block diagram 300 illustrating an in-flight counter being decremented after a hardware device has finished processing the request, according to an embodiment. In diagram 300, NIC 106 has finished processing buffer 132, as indicated by arrow 302 and "data from buffer 132" 304 being sent over network 306. After NIC 106 completes processing the request, NIC 106 may send a transmit interrupt indicating that NIC 106 has completed processing of the request. In some embodiments, the indication is a hardware interrupt from NIC 106. Kernel 120 may receive the indication and in response to the indication, decrement in-flight counter 115 from two to one, which indicates that application 114 has one queued buffer (buffer 136). Accordingly, while NIC 106 is processing buffer 132, the data in buffer 132 that is not yet transmitted is counted against application 114. As such, application 114 may send requests at a slower rate in the orphan late mode compared to the orphan early mode.

Although the orphan early mode has been described as being implemented when the condition is determined to be satisfied and the orphan late mode has been described as being implemented when the condition is determined to not be satisfied, this is not intended to be limiting. It should also be understood that the orphan late mode may be implemented when the condition is determined to be satisfied and the orphan early mode may be implemented when the condition is determined to not be satisfied.

3. Remove Association Between Buffer and Channel

Referring back to FIG. 1, association module 124 may remove the association 170 between buffer 132 and application 114. Association module 124 may remove the association between buffer 132 and application 114 early (e.g., before the hardware device has finished processing the request or before NIC 106 starts processing the request) because the queue has enough free space.

If association module 124 decrements in-flight counter 115 before removing the association, the association between buffer 132 and in-flight counter 115 may be removed at a later point in time (e.g., before or after NIC 106 is finished processing the request). When association module 124 removes the association, association module 124 "frees" the buffer and the OS resources that were consumed by the buffer may be reused for other purposes. If association module 124 removes the association between buffer 132 and application 114 before decrementing in-flight counter 115, association module 124 decrements in-flight counter 115 immediately; otherwise, association module 124 may be unable to determine which in-flight counter (e.g., in-flight counter 115 or in-flight counter 117) to decrement based on a request.

D. Transmit Interrupts

Referring back to FIG. 1, kernel 120 includes an interrupt controller 140 that enables and disables transmit interrupts based on whether a condition is satisfied. In an example, transmit interrupts are enabled and disabled for one or more queues associated with a hardware device or are enabled and disabled for the hardware device. In an example, transmit interrupts are enabled for queue 130 specific to NIC 106 while transmit interrupts are disabled for another queue specific to NIC 106. In another example, transmit interrupts are enabled for queue 130 specific to NIC 106 while transmit interrupts are disabled for another queue specific to a hardware device different from NIC 106.

In an example, when the amount of free space in queue 130 associated with NIC 106 exceeds the free threshold amount (e.g., partially empty), interrupt controller 140 may disable transmit interrupts for queue 130. In another example, when the amount of data stored in queue 130 associated with NIC 106 does not exceed the data threshold amount (e.g., partially empty), interrupt controller 140 may disable transmit interrupts for queue 130. When transmit interrupts are disabled for queue 130, NIC 106 does not send transmit interrupts to kernel 120. Interrupt controller 140 may disable transmit interrupts because the queue has enough free space and no channels are waiting for a hardware device to finish processing a request. As queue 130 stores more buffers, the amount of free space in queue 130 may eventually not exceed the queue threshold amount.

In an example, when the amount of free space in queue 130 associated with NIC 106 does not exceed the free threshold amount (e.g., partially full), interrupt controller 140 may enable transmit interrupts for queue 130. In another example, when the amount of data stored in queue 130 associated with NIC 106 exceeds the data threshold amount (e.g., partially full), interrupt controller 140 may enable transmit interrupts for queue 130. In another example, when an in-flight counter (e.g., in-flight counter 115) specific to a channel is zero, interrupt controller 140 may enable transmit interrupts for queue 130. When transmit interrupts are enabled for queue 130, NIC 106 sends to kernel 120 a transmit interrupt indicating that NIC 106 has finished processing a request (e.g., transmitted data over a network in response to a request from a channel). Interrupt controller 140 may enable transmit interrupts because the queue is running out of free space and channels may be waiting for a hardware device. The transmit interrupts are used to inform association module 124 when the hardware device has finished processing the request so that association module 124 can decrement the appropriate in-flight counter. To optimize system resources, NIC 106 may transmit a transmit interrupt after a particular quantity of requests have been processed by NIC 106. The transmit interrupts may also be used to inform association module 124 when the hardware device has finished processing the request so that association module 124 can remove the association between a channel and a buffer allocated for a request from the channel.

As discussed above and further emphasized here, FIGS. 1-3 are merely examples, which should not unduly limit the scope of the claims. For example, it should be understood that one or more modules may be combined with another module. In an example, allocator 122 and association module 124 are combined into one module. It should also be understood that a module may be separated into more than one module. In an example, association module 124 is separated into a first association module and a second association module.

Further, although application 114 was described as sending a request to be processed by a hardware device, application 16 may also send a request to be processed by the hardware device. In an example, kernel 120 may receive a first request from a first channel and determine that the condition is satisfied with respect to the first request. In such an example, association module 124, before the hardware device completes processing the request, may decrement an in-flight counter specific to the first channel, where the first in-flight counter represents the amount of data in the first channel. Kernel 120 may also receive a second request from a second channel and determine that the condition is not satisfied with respect to the second request. In such an example, association module 124, after the hardware device completes processing the second request, decrements the in-flight counter specific to the second channel, where the second in-flight counter represents an amount of data in the second channel. The first and second channel may be the same (e.g., both are application 114) or different (e.g., the first channel is application 114 and the second channel is application 116).

III. Another Example System Architecture

Further, FIG. 1 is an illustration of an embodiment in which the channel is an application. In another embodiment, the channel may be a virtual machine or a virtual device.

Figure 4:
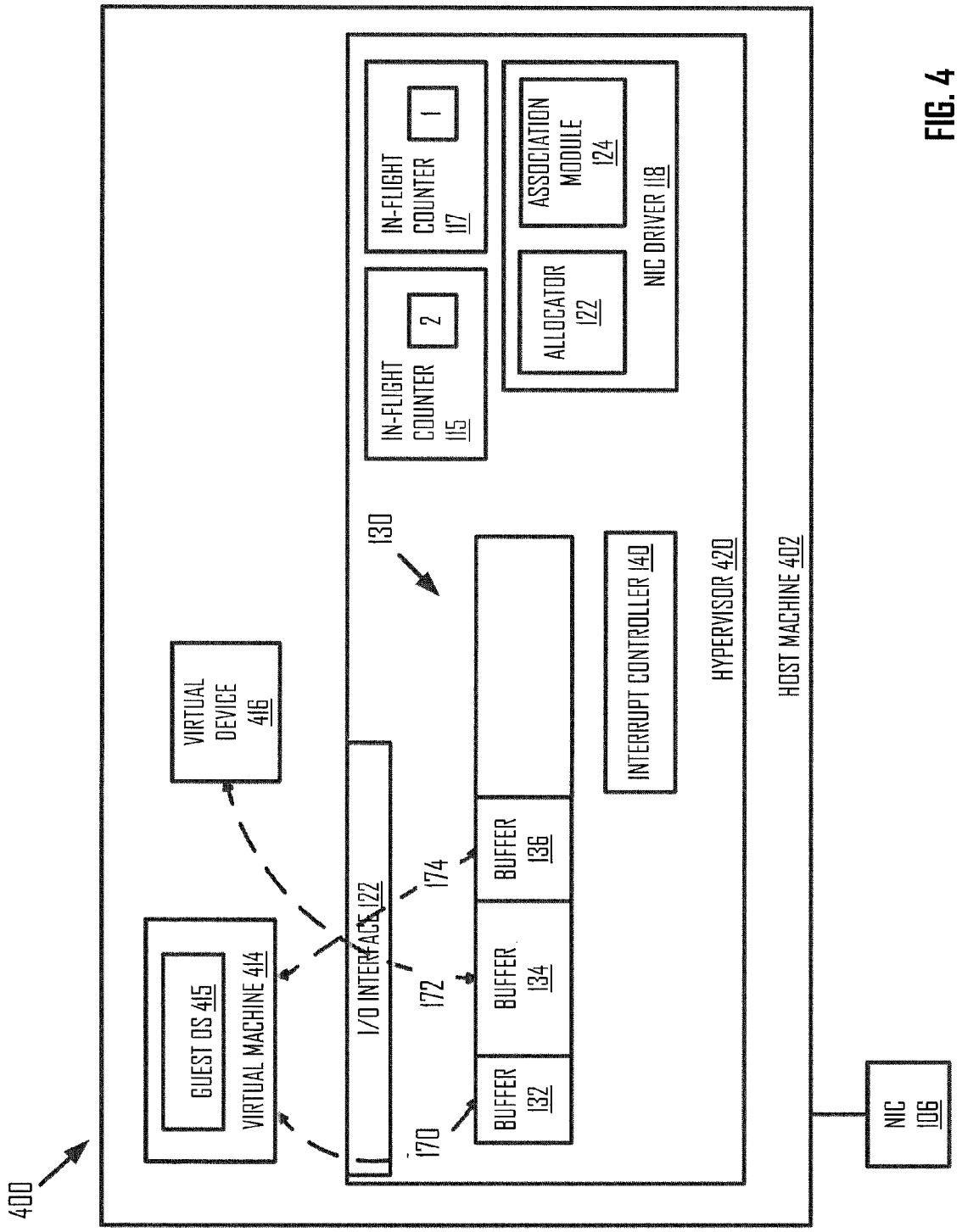
FIG. 4 is a simplified block diagram illustrating another system for processing a request from a channel, according to an embodiment.

FIG. 4 is a simplified block diagram 400 illustrating another system for processing a queue associated with a request, according to an embodiment. In diagram 400, a channel is illustrated as being a virtual machine 414 and another channel is illustrated as being a virtual device 416 executing in a host machine 402. In FIG. 4, buffer 132 is allocated for a request from virtual machine 414, buffer 134 is allocated for a request from virtual device 416, and buffer 134 is allocated for a request from virtual machine 414. In an example, virtual device 416 is a virtual NIC.

Host machine 402 (e.g., computer or server) is typically enabled to simultaneously run one or more virtual machines that run applications and services, where each virtual machine may be used by a local or remote client. Host machine 402 includes a virtual machine 414 and a hypervisor 420. The host machine allocates a certain amount of the host's resources to a virtual machine. Each virtual machine may use the allocated resources to execute applications, including an OS known as a guest OS. For example, in FIG. 4, virtual machine 414 includes a guest OS 415. Virtual machine 414 is a portion of software that, when executed on appropriate hardware, creates an environment allowing the virtualization of certain functionality of a physical computer system. A virtual machine may function as a self-contained platform, running its own OS and software applications.

Hypervisor 420 may virtualize the underlying hardware of the host machine or emulate hardware devices, making the use of the virtual machine transparent to the guest OS or the remote client that uses the virtual machine. Hypervisor 420 may manage allocation and virtualization of computer resources and may perform context switching, as may be necessary, to cycle between various virtual machines. A virtual machine running on a host machine may run a guest OS that may be different from another guest OS system running on the host machine and may also be different from the host OS running on the host machine. The host or guest OS may include, for example, MICROSOFT® WINDOWS®, LINUX®, SOLARIS®, and MAC® OS. Trademarks are the property of their respective owners. One or more applications may run on each guest OS (not shown). Hypervisor 420 may provide virtual machine 414 running on host machine 402 with access to hardware devices (e.g., NIC 106) to perform input/output (I/O).

IV. Example Method

Figure 5:
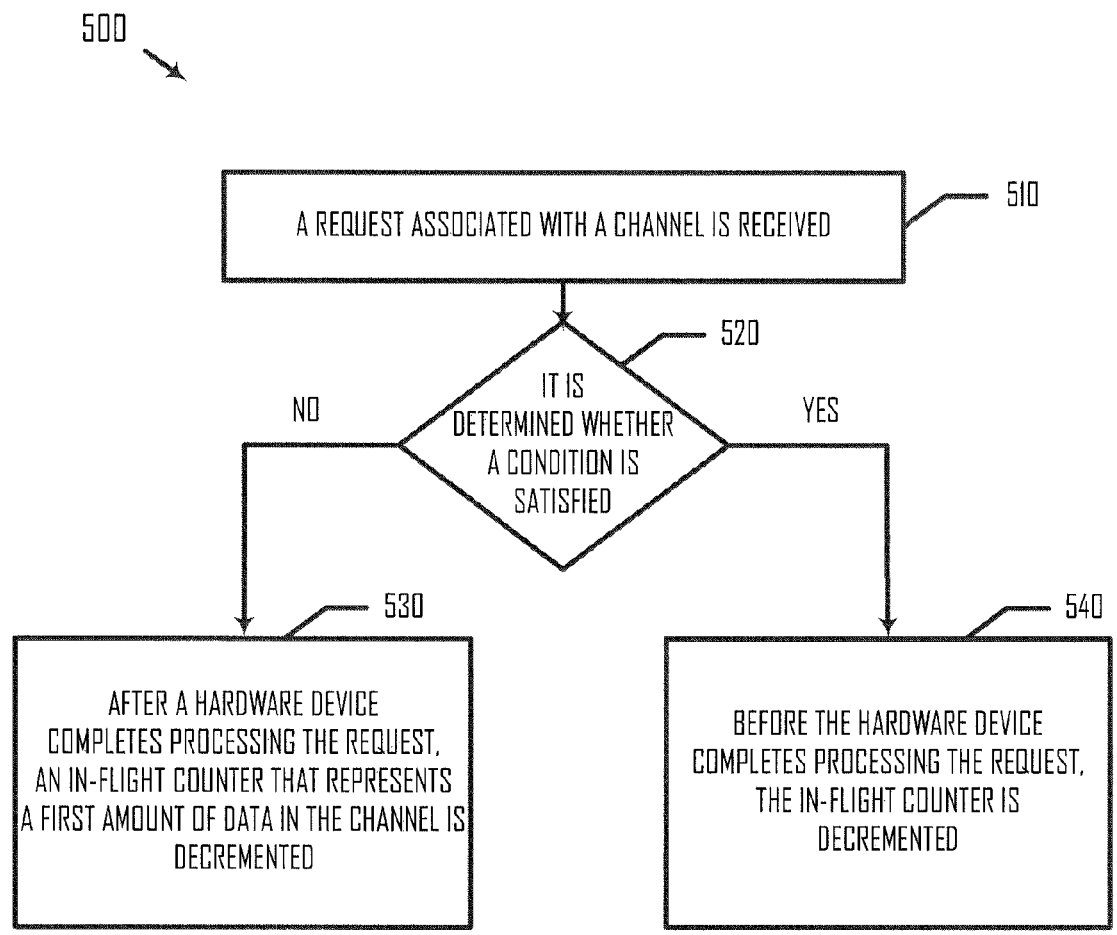
FIG. 5 is a simplified flowchart illustrating a method of processing a request from a channel, according to an embodiment.

FIG. 5 is a simplified flowchart illustrating a method 500 of processing a request from a chanel, according to an embodiment. Method 500 is not meant to be limiting and may be used in other applications.

Method 500 includes blocks 510-540. In a block 510, a request associated with a channel is received. In an example, I/O interface 122 receives a request associated with application 114. In a block 520, it is determined whether a condition is satisfied. In an example, association module 124 determines whether a condition is satisfied. In a block 530, when the condition is determined to not be satisfied, after a hardware device completes processing the request, an in-flight counter that represents a first amount of data in the channel is decremented. In an example, when the condition is determined to not be satisfied, association module 124, after NIC 106 completes processing the request, decrements in-flight counter 115, which represents a first amount of data for application 114. In a block 540, when the condition is determined to be satisfied, before the hardware device completes processing the request, the in-flight counter is decremented. In an example, when the condition is determined to be satisfied, association module 124, before NIC 106 completes processing the request, decrements in-flight counter 115.

It is also understood that additional processes may be performed before, during, or after blocks 510-540 discussed above. It is also understood that one or more of the blocks of method 500 described herein may be omitted, combined, or performed in a different sequence as desired.

V. Example Computing System

Figure 6:
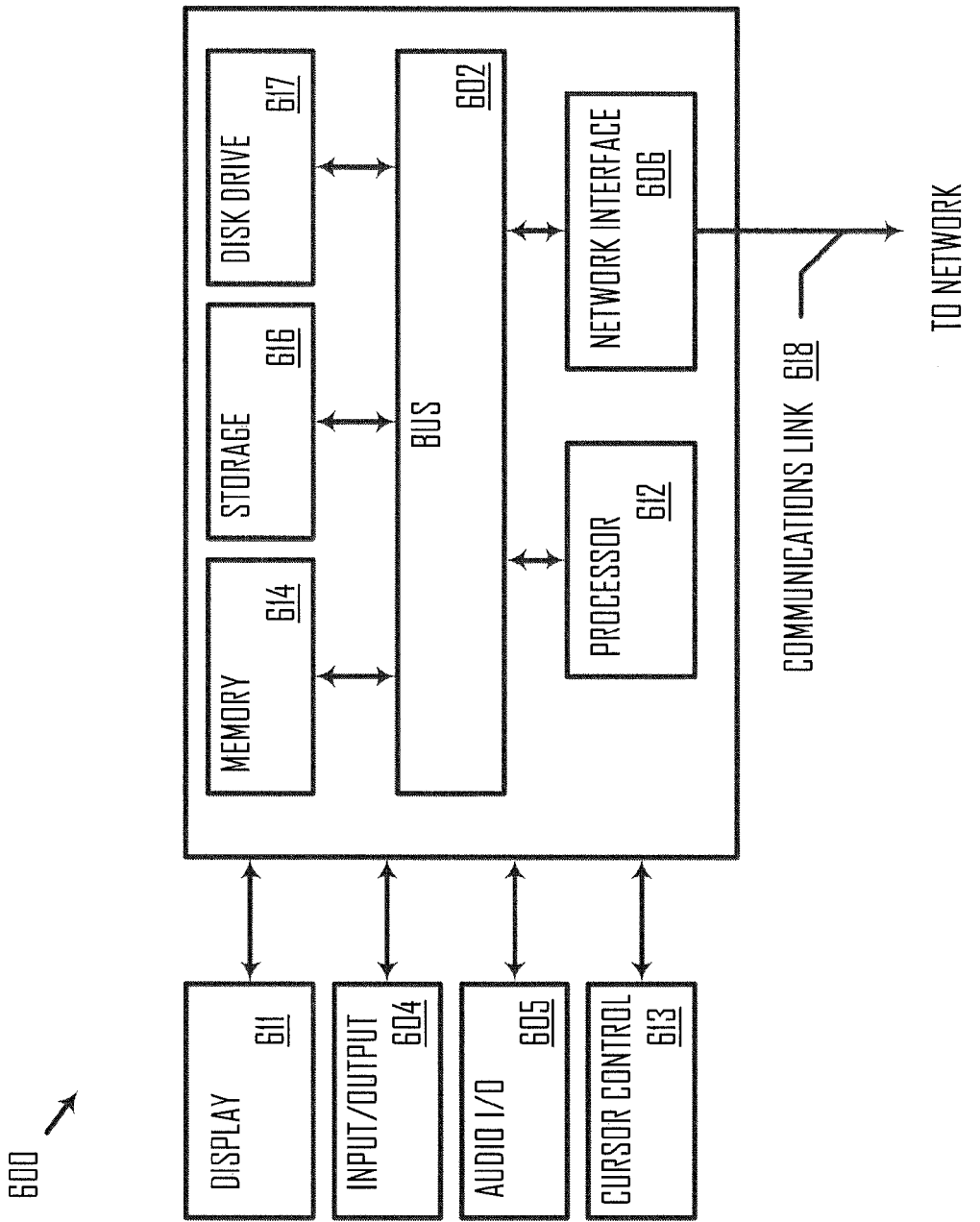
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, host machine 402 may include a client or a server computing device. Computing device 102 and host machine 402 may include one or more processors and may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of processing a request from a channel, comprising:
   receiving a request associated with a channel;
   allocating a buffer for the request;
   placing the buffer into a queue specific to a hardware device that processes the request, wherein the queue is in at most one of an orphan early mode or an orphan late mode;
   associating the buffer with the channel;
   determining whether a condition is satisfied;
   in response to a determination that the condition is not satisfied:
      decrementing an in-flight counter after the hardware device completes processing the request, the in-flight counter representing a first amount of data in the channel; and
      switching the queue from the orphan early mode to the orphan late mode if the queue is in the orphan early mode; and
   in response to a determination that the condition is satisfied:
      decrementing the in-flight counter before the hardware device completes processing the request associated with the buffer in the queue; and
      switching the queue from the orphan late mode to the orphan early mode if the queue is in the orphan late mode.

2. The method of claim 1, further including:
   determining whether the queue is in the orphan early mode or the orphan late mode, wherein the queue being in the orphan early mode indicates that the in-flight counter is to be decremented before the hardware device completes processing the request associated with the buffer in the queue, and wherein the queue being in the orphan late mode indicates that the in-flight counter is to be decremented after the hardware device completes processing the request associated with the buffer in the queue.

3. The method of claim 1, further including:
   incrementing the in-flight counter based on the request, wherein the in-flight counter is specific to the channel.

4. The method of claim 1, further including:
   removing the association between the buffer and the channel.

5. The method of claim 1, wherein the determining whether a condition is satisfied includes determining whether an amount of free space in the queue exceeds a free threshold amount.

6. The method of claim 1, further including:
   in response to the determination that the condition is satisfied, disabling transmit interrupts; and
   in response to the determination that the condition is not satisfied, enabling transmit interrupts.

7. The method of claim 6, wherein in response to the determination that the condition is not satisfied, receiving a transmit interrupt indicating that the hardware device has completed processing of the request, and wherein the decrementing includes after receiving the transmit interrupt, decrementing the in-flight counter.

8. The method of claim 1, further including:
   placing a set of packets associated with the request in the buffer allocated for the request, wherein the hardware device completes processing the request by processing the set of packets in the buffer.

9. The method of claim 1, wherein the in-flight counter represents a quantity of bytes stored in the channel and based on one or more requests from the channel, and wherein the in-flight counter is incremented by a quantity of bytes allocated for the request and stored in the buffer.

10. The method of claim 1, wherein the in-flight counter represents a quantity of packets stored in the channel and based on one or more requests from the channel, and wherein the in-flight counter is incremented by a quantity of packets allocated for the request and stored in the buffer.

11. The method of claim 1, wherein the in-flight counter represents a quantity of buffers stored in one or more queues and based on one or more requests from the channel, and wherein the in-flight counter is incremented by one.

12. The method of claim 1, wherein the receiving a request includes receiving a request from the channel to transmit a set of packets over a network, the method further including:
   sending the request to a network device to transmit the set of packets over the network.

13. The method of claim 1, wherein the condition is satisfied with respect to the first request, the method further including:

receiving a second request associated with a second channel;

determining that the condition is not satisfied with respect to the second request; and after the hardware device completes processing the second request, decrementing an in-flight counter that represents a second amount of data in the second channel.

14. A system for processing a request from a channel, comprising:

an input/output (I/O) interface that receives a request associated with a channel;

an allocator that allocates a buffer for the request, places the buffer into a queue specific to a hardware device that processes the request, and associates the buffer with the channel, wherein the queue is in at most one of an orphan early mode or an orphan late mode; and an association module that determines whether a condition is satisfied, wherein in response to a determination that the condition is not satisfied: the association module decrements an in-flight counter after the hardware device completes processing the request, wherein in response to a determination that the condition is satisfied, the association module decrements the in-flight counter before the hardware device completes processing the request associated with the buffer in the queue, and wherein the in-flight counter represents a first amount of data in the channel, and wherein in response to the determination that the condition is not satisfied and the queue is in an orphan early mode, the association module switches the queue from the orphan early mode to an orphan late mode, and wherein in response to the determination that the condition is satisfied and the queue is in the orphan late mode, the association module switches the queue from the orphan late mode to the orphan early mode.

15. The system of claim 14, wherein the association module determines whether the queue is in the orphan early mode or the orphan late mode, wherein the queue being in the orphan early mode indicates that the in-flight counter is to be decremented before the hardware device completes processing the request associated with the buffer in the queue, and wherein the queue being in the orphan late mode indicates that the in-flight counter is to be decremented after the hardware device completes processing the request associated with the buffer in the queue.

16. The system of claim 14, wherein the association module increments the in-flight counter based on the request and removes the association between the buffer and the channel, and wherein the in-flight counter is specific to the channel.

17. The system of claim 14, wherein when an amount of free space in the queue exceeds a free threshold amount, the condition is satisfied, the system further including:

an interrupt controller that determines whether the condition is satisfied, wherein in response to the determination that the condition is not satisfied, the interrupt controller disables transmit interrupts, and wherein in response to the determination that the condition is satisfied, the interrupt controller enables transmit interrupts.

18. The system of claim 14, wherein the allocator places a set of packets associated with the request in the buffer, wherein the hardware device is a network interface card that processes the request by transmitting the set of packets in the buffer over a network, and wherein when the transmit interrupts are enabled, the association module receives a transmit interrupt sent from the hardware device that indicates to the association module that the network interface card has finished processing the request.

19. The system of claim 14, wherein the channel is at least one from the group including an application, a virtual machine, and a virtual device.

20. A machine-readable medium comprising a plurality of machine-readable instructions that when executed by one or more processors is adapted to cause the one or more processors to perform a method comprising:

receiving a request associated with a channel;

allocating a buffer for the request;

placing the buffer into a queue specific to a hardware device that processes the request, wherein the queue is in at most one of an orphan early mode or an orphan late mode;

associating the buffer with the channel;

determining whether a condition is satisfied;

in response to a determination that the condition is not satisfied:

decrementing an in-flight counter after a hardware device completes processing the request, the in-flight counter representing a first amount of data in the channel; and switching the queue from the orphan early mode to the orphan late mode if the queue is in the orphan early mode; and in response to a determination that the condition is satisfied:

decrementing the in-flight counter before the hardware device completes processing the request associated with the buffer in the queue; and switching the queue from the orphan late mode to the orphan early mode if the queue is in the orphan late mode.

* * * * *